United States Patent [19]

Quinto

[11] Patent Number: 5,054,515
[45] Date of Patent: Oct. 8, 1991

[54] CARTRIDGE VALVE

[76] Inventor: Mario J. Quinto, 70 Dannell Dr., Stamford, Conn. 06905

[21] Appl. No.: 474,228

[22] Filed: Feb. 2, 1990

Related U.S. Application Data

[63] Continuation-in-part of Ser. No. 293,110, Jan. 3, 1989, abandoned.

[51] Int. Cl.$^5$ .............................................. F16K 51/00
[52] U.S. Cl. ................................................. 137/454.5
[58] Field of Search ............... 137/454.2, 454.5, 454.6, 137/597

[56] References Cited

U.S. PATENT DOCUMENTS

| | | | |
|---|---|---|---|
| 677,137 | 6/1901 | Leavitt .......................... | 137/454.5 X |
| 3,347,260 | 10/1967 | Lewis et al. .................. | 137/454.6 X |

Primary Examiner—Stephen M. Hepperle
Attorney, Agent, or Firm—John H. Crozier

[57] ABSTRACT

A cartridge valve having a cartridge valve which has no O-ring seals in critical areas of transit flow between the cartridge and the manifold. In one preferred embodiment for a sliding-type, multi-port cartridge valve, the ported sleeve in which the sliding spool is mounted has raised circumferential sealing ridges around its outer periphery where O-rings would conventionally be located. The outer peripheral surfaces of the ridges define a taper which is identical to the taper of the cavity of the manifold block into which the valve is inserted. When the valve is seated in the cavity, the peripheral surfaces of the ridges bearing against the cavity surface provide sealing between ports or sets of ports in the sleeve and the manifold block without requiring the use of O-rings. In another preferred embodiment, the ported sleeve has a smooth taper which matches and seals against a corresponding smooth tapered cavity. Fluid control functions, such as metering, may be included as inserts in one or more of the ports in the sleeve and/or may be installed in the sleeve itself between ports.

19 Claims, 3 Drawing Sheets

CARTRIDGE VALVE

This is a continuation-in-part of co-pending application Ser. No. 07/293,110 filed on Jan. 3, 1989, now abandoned.

BACKGROUND OF THE INVENTION

1. Field of the Invention

This invention relates to cartridge valves generally and, more particularly, to a novel cartridge valve that eliminates the need for O-ring seals in critical areas, as are now employed in conventional cartridge valves, and to such a novel cartridge valve that may include control functions such as metering and fluid control within and/or on the cartridge valve itself.

2. Background Art

Although cartridge valves may be found in many applications, they are especially useful and economical in hydraulic control applications where there are a number of control functions to be serviced. Some such applications are found in fluid power and fluid control systems as used in industrial, mobile, marine, aircraft, and space vehicles, for example. Prior to the use of multiple cartridge valves, individual valves were employed which required a substantial amount of piping and associated fittings. With the use of multiport cartridge valves mounted in a common manifold block having appropriate internal passages, piping is greatly simplified and a more compact and economical installation results. Equally as important, should a valve need to be replaced, it is a simple matter to remove the cartridge valve from the block and replace it with another without having to disassemble any piping. This not only saves time, but also eliminates an opportunity for leaks to develop which may happen any time that piping is disassembled and reconnected.

Typically, a cartridge valve, for example of the sliding spool type, comprises a solid cylindrical spool having a series of alternating lands and valleys, which spool is adapted for axial movement within a close fitting ported generally round, hollow sleeve. The ports on the sleeve are typically associated with internal passages of a manifold block and are arranged as necessary for the function serviced. The lands on the spool redirect the flow of a fluid as the spool slides axially in response to a spool-position control mechanism.

Sealing between the outer peripheral surface of the sleeve and the bore in which the valve is positioned is accomplished by O-rings inserted in raised circumferential annular grooves formed along the periphery of the sleeve between ports or groups of ports. These O-rings engage and are deformed by the bore of the block and thus seal one port or set of ports from adjacent ones. While these O-rings can provide a satisfactory seal, they have several disadvantages. Among these are that the seals must be carefully chosen to be compatible with the fluid to be contacted in the valve and a choice for one fluid may prevent the use of another fluid with the same valve. Also, even if compatible with a fluid, there may be aging and/or chemical degradation over time. Another disadvantage is that the ports and grooves in the manifold when formed are sharp-edged and tend to cut the O-rings as the cartridge valve is inserted. This will remain undetected until the valve is tested or placed in service, or, even if it passes a test, may lead to early failure. To minimize this problem, the edges of the ports and grooves must be stoned or deburred to provide a less sharp edge. Also, deep cavities are difficult to inspect. Of course, installation of the O-rings requires careful labor and the O-rings also take up space.

In many fluid control systems, certain control functions are required, such as, metering, bleeding, directional control, check valving, and pressure reduction. Typically, these control functions are handled by separate discrete components which are interconnected by piping. Such an arrangement is relatively expensive and introduces into the system additional potential points of leakage and failure at the connection points. Servicing is also complicated by the necessity of having to break these numerous connections and having to reconnect them which may result in an unsatisfactory, leaking connection.

Accordingly, it is a principal object of the present invention to provide a cartridge valve constructed without O-rings in critical areas.

Another object of the present invention is to provide such a cartridge valve that is simple and economical to construct.

An additional object of the present invention is to provide such a cartridge valve that may be used with a wide range of fluids without the necessity of changing any components thereof.

A further object of the present invention is to provide such a cartridge valve which may, alternatively, either have a shorter length, for a given fluid flow, to make it more compact and economical for lighter manifold housings, or, for a given length, to increase the inlet and outlet sizes of the ports to allow higher flow rates and/or lower pressure drops of the transit fluid.

Yet another object of the present invention is to provide such a cartridge valve that eliminates the damage to O-rings presently occurring during repeated removal and insertion of cartridge valves for inspection, troubleshooting, etc.

Yet an additional object of the present invention is to provide such a cartridge valve that may be used with conventionally constructed manifold bodies.

Yet a further object of the present invention is to provide such a cartridge valve that may include a variety of fluid control elements within the valve itself.

Other objects of the present invention, as well as particular features and advantages thereof, will, in part, be obvious and will, in part, be apparent from the following description and the accompanying drawing.

SUMMARY OF THE INVENTION

The present invention overcomes the disadvantages of conventional cartridge valves by providing a cartridge valve which has no O-ring seals in critical areas of transit flow between the cartridge and the manifold. In one preferred embodiment for a sliding-type, multiport cartridge valve, the ported sleeve in which the sliding spool is mounted has raised circumferential sealing ridges around its outer periphery where O-rings would conventionally be located. The outer peripheral surfaces of the ridges define a taper which is identical to the taper of the cavity of the manifold block into which the valve is inserted. When the valve is seated in the cavity, the peripheral surfaces of the ridges bearing against the cavity surface provide sealing between ports or sets of ports in the sleeve and the manifold block without requiring the use of O-rings. In another preferred embodiment, the ported sleeve has a smooth taper which matches and seals against a corresponding smooth tapered cavity. In the latter embodiment, fluid control functions, such as metering, may be included as inserts in one or more of the ports in the sleeve or may be installed in the sleeve itself between ports.

DESCRIPTION OF THE PREFERRED EMBODIMENTS

Figure 1:
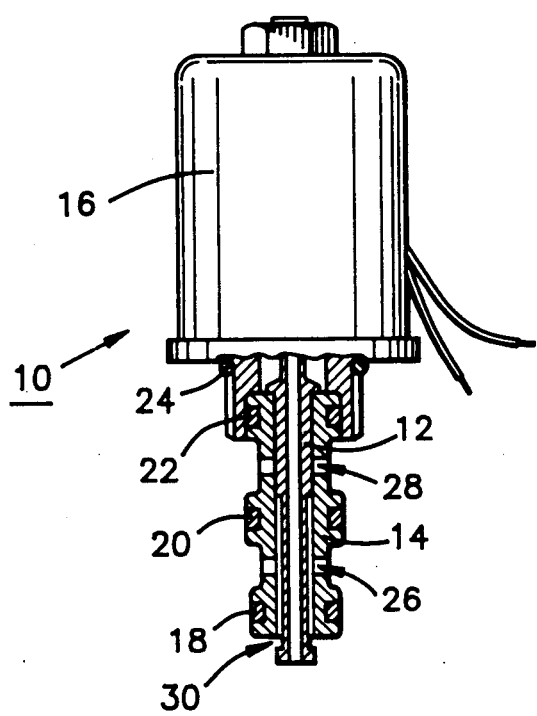
FIG. 1 is a longitudinal cross-sectional view of a sliding spool cartridge valve of conventional construction.

Referring now to the Drawing, FIG. 1 is a longitudinal cross-sectional view of a two-position, three-way sliding spool cartridge valve of conventional construction, generally indicated by the reference numeral 10, which includes a cylindrical spool 12 disposed for axial back-and-forth motion within a closely fitting, generally round, hollow sleeve 14. Spool 12 is moved between its first position as shown on FIG. 1 to its second position (not shown) by actuator means 16 which, in this case, may be assumed to be an electrically actuated solenoid. Actuator means 16 need not be an electrically actuated solenoid but may be any actuator means known in the art, such as manual or hydraulic means. The actuator selected may be double acting or it may include biasing means. Mounted on sleeve 14, as shown, are O-rings 18, 20, 22, and 24 and defined through the wall of sleeve 14 and openings 26, 28, and 30.

Figure 2:
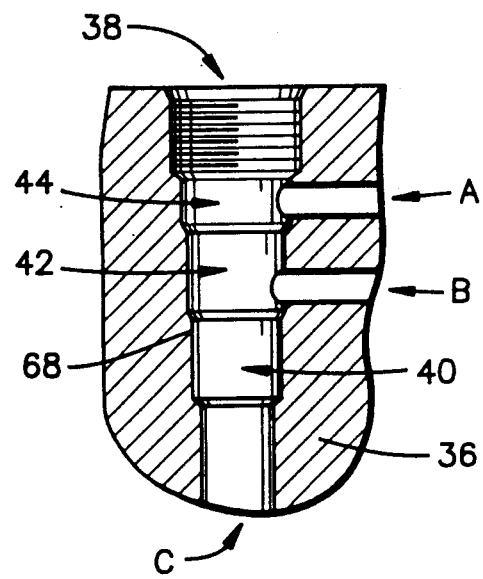
FIG. 2 is a longitudinal cross-sectional view of a section of a manifold block with which the cartridge valve of FIG. 1 mates.

FIG. 2 shows a section 36 of a manifold block, or a body, defining therein a generally round internal cavity 38 in which cartridge valve 10 is disposed (not shown) when in operating position. Section 36 includes chambers 40, 42, and 44 defined within cavity 38 and ports A, B, and C communicating with the chambers, as shown. When cartridge valve 10 is disposed within cavity 38, it will be understood that O-ring 18 will seal between sleeve 14 and the wall of chamber 40 and O-ring 20 will seal between the sleeve and the wall of chamber 42. O-ring 22 prevents fluid in chamber 44 from entering actuator means 16 and O-ring 24 prevents such fluid from leaking from the manifold block. It will also be understood that when spool 12 is in its first position, ports B and C will be connected through chambers 40 and 42 and openings 26 and 30, and when the spool is in its second position, ports A and B will be connected through chambers 42 and 44 and openings 26 and 28. When there is a high pressure difference between ports, O-rings 18, 20, and 22 may have backing rings on one or both sides thereof (not shown). Having chambers 40, 42, and 44 having increasingly small diameters from the open end of cavity 38 to the inside of section 36 permits convenient insertion of cartridge 10 and also minimizes the number of port openings that the O-rings must pass across; although, a valve assembly could also be constructed wherein the bore of the cavity in the manifold block were straight. However, in a straight design, there would inherently be problems with cutting O-rings during insertion of the cartridge valve.

Figure 3:
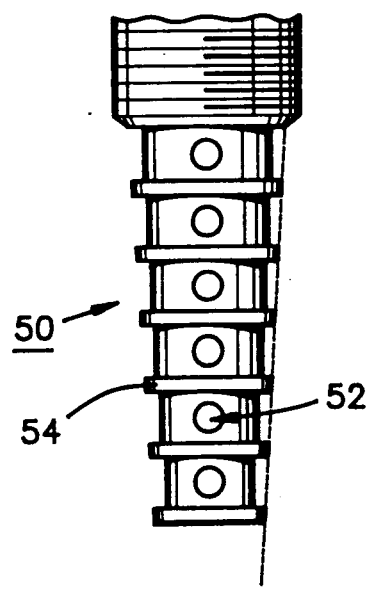
FIG. 3 is side elevation view of the sleeve of a sliding spool cartridge valve constructed according to one embodiment of the present invention.

FIG. 3 shows a sleeve, generally indicated by the reference numeral 50, which has openings defined through the wall thereof, as at 52. It will be understood that sleeve 50 would be fitted with a sliding spool (not shown) and actuator means (not shown), generally as described with reference to FIG. 1, in order to provide a complete sliding spool cartridge valve. An important feature of sleeve 50 is that, rather than having O-rings disposed between each pair of openings 52 for sealing as described above, there are provided annular ridges, as at 54. The outer peripheries of ridges 54 fall along a taper line (shown in phantom), such that the outer peripheral surfaces define a truncated cone, the base of which is toward the actuator end of sleeve 50. Where desired, sleeve 50 may have conventional O-rings (not shown), such as O-rings 22 and 24 on cartridge valve 10 (FIG. 1), as these O-rings have been found to be satisfactory in many applications.

Figure 4:
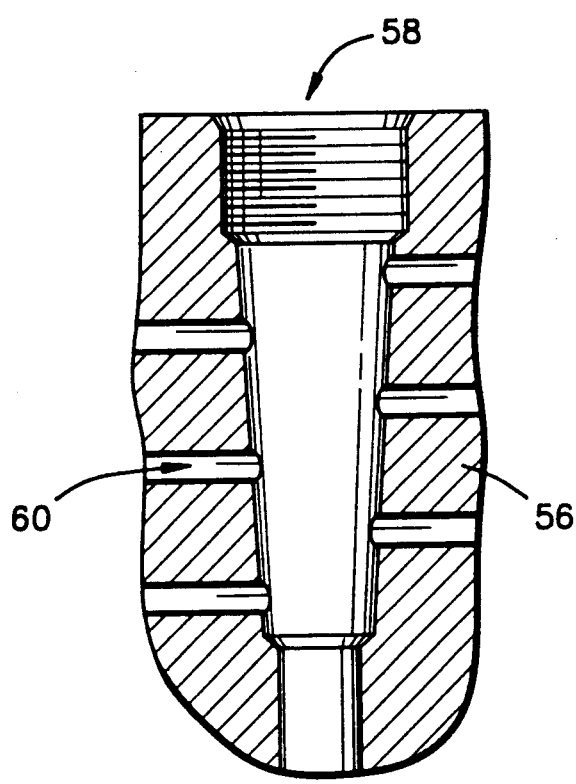
FIG. 4 is a longitudinal cross-sectional view of a section of a manifold block with which the sleeve of FIG. 3 mates.

FIG. 4 shows a section 56 of a manifold block having defined therein a cavity 58 which mates with sleeve 50 when the cartridge valve of which the sleeve is a part is inserted into the manifold block to form a valve system. Cavity 58 has, ia part, the shape of a truncated cone having the same slope as the truncated cone defined by the peripheral surfaces of ridges 54 on sleeve 50. It will be understood that when the cartridge valve is so inserted, each of ridges 54 bears against the cone shaped portion of cavity 58 and seals between one pair of ports, as at 60. The ridges thus provide the necessary sealing between ports without the use of O-rings.

The angle of the cone shape employed may be preferably on the order of two to three degrees and standard Morse tapers may be used; however, it is shown on the Drawing as being about five degrees to show the slope more clearly. With ordinary machining methods, any gaps between ridges 54 on sleeve 50 and the surface of cavity 58 can be held to on the order of 0.0001 inch to zero. Any leakage across these gaps would be negligible compared to the leakage through the interface of a spool and a sleeve which is typically on the order of 0.0003 inch in high pressure valves. Labyrinth grooves may be formed on the mating surfaces to reduce leakage rate where desired. Also, difference in hardness may be of advantage, whereby the manifold may be of a softer material which may be deformed somewhat and a suitable plastic material may be used. In addition, sharp corners may be employed to reduce the amount of force required for effective sealing.

Since O-rings, and backup rings if used, in critical areas have been eliminated with the present invention, it can be seen that the length of the sleeve can be made shorter; or, alternatively, the openings in the sleeve can be made larger for a given length, thus reducing pressure drop or allowing higher flow rates at the same pressure drop.

Figure 5:
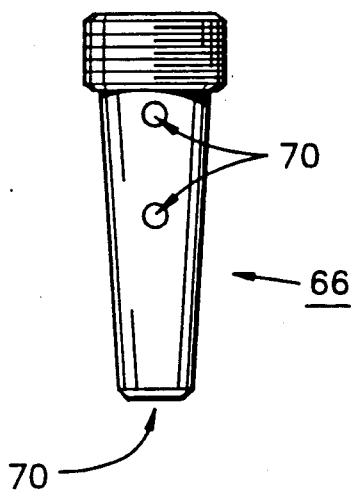
FIG. 5 is a side elevation view of the sleeve of a cartridge valve constructed according to a first alternative embodiment of the present invention.

FIG. 5 shows a sleeve, generally indicated by the reference numeral 66, for use with the conventional manifold block 36 of FIG. 2. Here, no annular ridges, as at 54 on sleeve 50 of FIG. 3, are provided; rather, the outer surface of sleeve 66 defines a truncated cone sized so as to engage the edges between the chambers, such as edge 68 between chambers 40 and 42 in manifold block 36 (FIG. 2). Sleeve 66 also has openings 70 for communication with ports A, B, and C in manifold block 36. Thus, this embodiment of the present invention provides a cartridge that may be used with conventional manifolds, thereby quickly and economically eliminating the problems of conventional cartridges without having to substantially modify existing systems. If desired, of course, new manifold blocks may be constructed, as shown on FIG. 2, for use in the present invention.

It can be seen that a sleeve of the type of sleeve 66 on FIG. 5 can be employed with a manifold having a cavity of the type of cavity 58 on FIG. 4, when properly ported.

Figure 6:
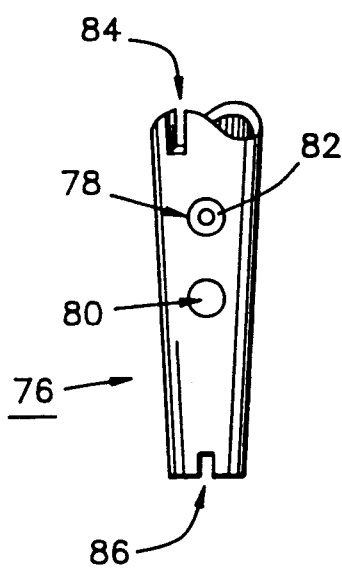
FIG. 6 is a side elevation view of the sleeve of a cartridge valve constructed according to an second alternative embodiment of the present invention including radial indexing means.

FIG. 6 shows another embodiment of the present invention, wherein a sleeve, generally indicated by the reference numeral 76, has two ports 78 and 80. Sleeve 76 includes an important aspect of the present invention, in that port 78 has included therein a flow control element, here a restriction orifice plate 82. Also included in sleeve 76 are indexing notches 84 and 86 which may be employed with the cartridge valve sleeves of the present invention to radially adjust and retain the sleeves so that the fluid transit ports are properly aligned. No particular axial retaining means are shown for sleeve 76, as any conventional means for axially positioning the sleeve from either end may be included. The latter is true for other configurations of sleeves of the present invention, as well.

Figure 7:
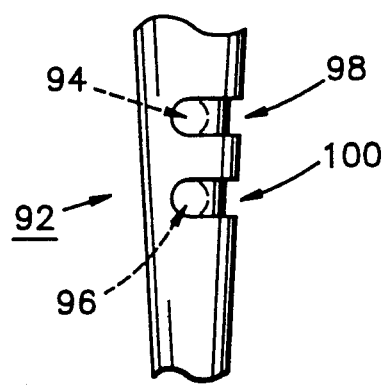
FIG. 7 is a side elevation view of the sleeve of a cartridge valve constructed according to a third alternative embodiment of the present invention.

FIG. 7 shows yet another embodiment of the present invention, wherein a sleeve, generally indicated by the reference numeral 92 has two ports 94 and 96, with annular grooves 98 and 100 associated with the ports, respectively, extending partially around the surface of sleeve. This embodiment is especially useful in permitting a greater flow of fluid for a given pressure drop or in lowering the pressure drop for a given flow rate of fluid.

Figure 8:
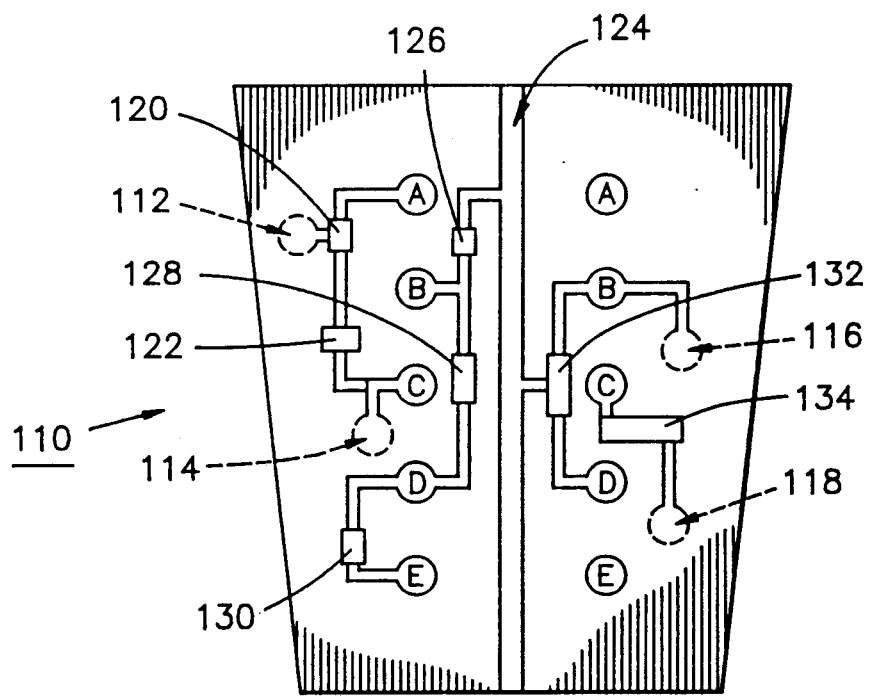
FIG. 8 is a representation of the surface of a sleeve of the types of FIGS. 5–7 with fluid control circuitry on the outer surface thereof.

Another important aspect of the invention is illustrated on FIG. 8 which is a representation of the entire outer surface of a cartridge valve sleeve, generally indicated by the reference numeral 110, having ports indicated by the letters "A"-"E", with fluid flow control circuitry disposed in the outer surface of the sleeve, comprising fluid control elements connected between the sleeve ports and ports 112, 114, 116, and 118 (shown dashed) in the manifold block (not shown). It will be understood that the circuitry shown does not represent any particular circuitry for a particular function, but merely represents the types of flow control elements which may be employed.

For example, a pressure reducing valve 120 may be disposed between port "A" and port 112, with a check valve 122 disposed between the pressure reducing valve and ports "C" and 114. A pressure balancing groove 124 may be formed in the surface of sleeve 110 to eliminate having to drill a longitudinal hole through the spool for that function. A pressure compensated flow control valve 126 may be provided between pressure balancing groove 124 and port "B", a shuttle valve 128 provided between port "B" and port "D", and a pressure reducing valve 130 between port "D" and port "E". Likewise, a reverse shuttle valve 132 may be provided between pressure balancing groove 124 and ports "B" and "D" and a filter provided between ports "C" and 118.

Figure 9:
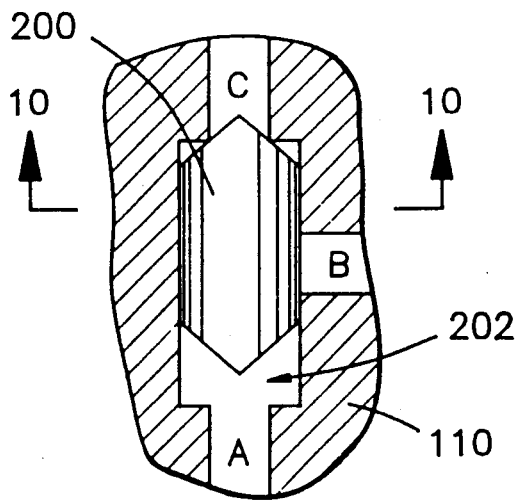
FIG. 9 is a top plan view, partially in cross-section, of one type of fluid control element that may be disposed in the surface of a sleeve.
Figure 10:
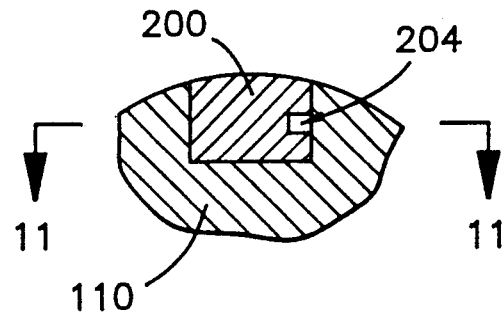
FIG. 10 is a cross-sectional view taken along line "10—10" of FIG. 9.
Figure 11:
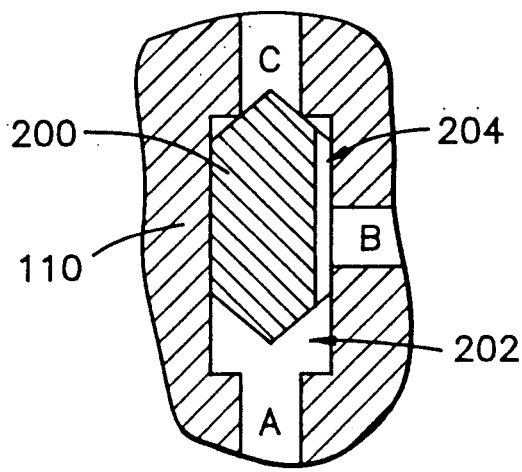
FIG. 11 is a cross-sectional view taken along line "11—11" of FIG. 10.

FIGS. 9–11 illustrate how one type of fluid control element may be adapted for use in the surface of sleeve 110 of FIG. 8. Here, a shuttle valve 200 is disposed for closely fitting back-and-forth motion within a channel 202 formed in the surface of sleeve 110. In the position of shuttle valve 200 shown on FIGS. 9 and 11, the pressure at port "A" in sleeve 110 is greater than the pressure at port "C" and, therefore, the shuttle valve has moved to a position in which it blocks port "C", permitting fluid flow from port "A" to port "B" through a channel 204 formed in the side of the shuttle valve. When the pressure at port "C" exceeds that at port A, shuttle valve 200 will move to a position in which it blocks port "A" and fluid will flow through channel 204 from port "C" to port "B".

Figure 12:
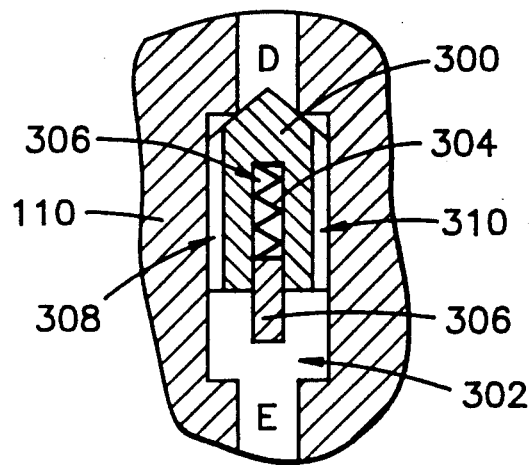
FIG. 12 is a top plan view, in cross-section, of another type of fluid control element that may be disposed in the surface of a sleeve.

FIG. 12 illustrates another type of flow control element disposed in sleeve 110. Here, a spring-loaded check valve or unloading valve 300 is disposed for closely fitting back-and-forth motion within a channel 302 formed n sleeve 110. Valve 300 is biased to the position shown on FIG. 12 by means of a spring 304 disposed between an island 306, the island being fixed with respect to sleeve 110, and the inner end of a channel 306 formed in the valve. When the pressure a port "D" exceeds the force exerted by spring 304, valve 300 will move away from port "D", with the valve sliding over island 306, and fluid will flow from port "D" to port "E" through channels 308 and 310 formed in the sides of valve 300.

It will be understood by those having ordinary skill in the art that a large number of conventional flow control elements can be adapted for use in the surface of sleeve 110 by following the teaching of the above examples.

Flow control elements 200 and 300 may be constructed of any suitable material and may be machined from a metal compatible with the fluids. Channels 202 and 302 may be machined into the surface of sleeve 110.

Thus, complex fluid transit paths may be formed on the outer surface of sleeve 110 within which paths may be formed or disposed fluid control elements as described above, eliminating the need for separate elements and interconnecting piping. Maintenance and troubleshooting of such a control circuit in the field is greatly simplified by a mechanic being able to replace the entire circuit by simply and quickly replacing a single cartridge valve which may then be conveniently cleaned and or rebuilt in a shop, if desired. Although not as convenient as having the control circuitry in the peripheral surface of a cartridge valve sleeve, the circuitry could also be included on the inner surface of the cavity in which the sleeve is positioned (not shown) and such is within the intent of the present invention.

it is also within the intent of the invention to provide conventional sleeves having fluid control elements as described above on the surface thereof and/or in ports thereof.

Materials for the cartridge valve can be any that are compatible with the fluids and temperatures to be encountered and can be metallic, polymeric, or other materials known in the art. If the valve is to be used at very high or very low temperatures, it is preferable to construct all components of the same material or of different materials having approximately identical coefficients of thermal expansion. The materials chosen may also be coated for corrosion resistance, or for thermal expansion compensation, and/or for improved sealing, for example, as is known in the art.

While the cartridge valve of the present invention is indicated as being held within the manifold by means of threaded surfaces, as indicated on FIGS. 3, 4, and 5, it is within the intent of the present invention to provide any of a number of securing means known in the art.

It will be understood that, while the present invention has been described as being applied to a sliding spool cartridge valve, the use of the novel features of the invention may be applied as well to other types of cartridge valves, or valves in which the moving means does not comprise a spool, and such is within the intent of the invention. It is also not necessary to the practicing of the present invention that the actuator means move, say a spool, between only first and second positions, as cartridge valves within the intent of the invention include proportional flow valves. It is also not necessary that the cartridge valve of the present invention accommodate two or more flow paths, as it is also applicable to self-actuated pressure relief cartridge valves.

It will thus be seen that the objects set forth above, among those made apparent from the preceding description, are efficiently attained and, since certain changes may be made in the above construction without departing from the scope of the invention, it is intended that all matter contained in the above description or shown on the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An improved cartridge valve of the type having a generally round, hollow sleeve, said sleeve having at least one annular sealing means thereon which at least one annular sealing means, when said cartridge valve is inserted into a cavity, forms a seal with the wall of said cavity around said sleeve, wherein said improvement comprises:
   (a) said at least one sealing means comprises a raised annular ridge formed on said sleeve;
   (b) the peripheral surface of said annular ridge defines a truncated cone having a major axis coincident with the major axis of said sleeve, such that when said sleeve is positioned in said cavity, said peripheral surface of said ridge will form said seal with said wall of said cavity; and
   (c) said peripheral surface includes fluid control circuitry therein.

2. An improved cartridge valve, as defined in claim 1, further comprising:
   (c) a movable member within said hollow sleeve, said movable member having at least first and second positions, such that movement of said movable member between said at least first and second positions will selectively change the path of the flow of a fluid through said valve.

3. An improved cartridge valve, as defined in claim 2, further comprising:
   (d) actuator means to effect said movement between said at least first and second positions.

4. An improved cartridge valve, as defined in claim 1, wherein each of said annular ridges is formed between two openings defined through the wall of said hollow sleeve.

5. An improved cartridge valve, as defined in claim 2, wherein said movable member comprises a spool.

6. An improved cartridge valve, as defined in claim 5, wherein said movable member comprises a sliding spool.

7. A cartridge valve system, as defined in claim 4, further comprising a fluid control element disposed in one of said openings defined in said sleeve.

8. A cartridge valve system, comprising:
   (a) a body having defined therein at least one open cavity, said cavity having at least a portion thereof in the shape of a truncated cone;
   (b) at least two ports defined in said body communicating with said cavity;
   (c) a generally round, hollow sleeve having at least two openings defined through the wall thereof;
   (d) at least one raised annular ridge formed in the outer periphery of said hollow sleeve between said openings;
   (e) the peripheral surface of said annular ridge defining a truncated cone having the same conical angle as said at least a portion of said open cavity, such that, when said sleeve is positioned in said cavity, said peripheral surface of said annular ridge will form a seal with the wall of said cavity around said sleeve between said ports; and
   (f) said peripheral surface includes fluid control circuitry therein.

9. A cartridge valve system, as defined in claim 8, further comprising:
   (f) a movable member disposed within said sleeve, said movable member having at least first and second positions, such that movement of said movable member between said at least first and second positions will selectively change the path of the flow of a fluid through said valve.

10. A cartridge valve system, as defined in claim 9, further comprising:
    (g) actuator means to move said movable member between said at least first and second positions.

11. A cartridge valve system, as defined in claim 9, wherein said movable member comprises a spool.

12. A cartridge valve system, as defined in claim 9, wherein said movable member comprises a sliding spool.

13. A cartridge valve system, as defined in claim 8, further comprising a fluid control element disposed in one of said openings defined in said sleeve.

14. An improved cartridge valve of the type having a generally round, hollow sleeve, said cartridge valve to be inserted in a manifold cavity, said manifold cavity comprising an opening through which said cartridge valve is inserted and a series of connected cylindrical hollow chambers having co-linear major axes, the diameters of said chambers becoming progressively smaller the farther their disposition from said opening, and there being a ridge formed in the manifold cavity between each pair of said chambers, wherein said improvement comprises: providing said sleeve of said cartridge valve in the shape of a truncated cone, such that, when said cartridge valve is inserted in said manifold cavity, sealing between said chambers is effected by the engagement of the outer periphery of said sleeve with said ridges between said chambers; and further providing fluid control circuitry in said peripheral surface.

15. A cartridge valve system, as defined in claim 14, further comprising a fluid control element disposed in one of said ports defined in said sleeve.

16. A cartridge valve system, comprising:
(a) a body having defined therein at least one open cavity, said cavity having at least a portion thereof in the shape of a truncated cone;
(b) at least two ports defined in said body communicating with said cavity;
(c) a sleeve having a generally round hollow interior and at least a portion of the peripheral surface of said sleeve defining a truncated cone having the same conical angle as said at least a portion of said open cavity, such that, when said sleeve is positioned in said cavity, said at least a portion of said peripheral surface of said sleeve will form a seal with said at least a portion of said cavity;
(d) said sleeve having at least two ports defined therein communicating with said hollow interior; and
(e) said peripheral surface includes fluid control circuitry therein.

17. A cartridge valve system, as defined in claim 16, further comprising a fluid control element disposed in one of said ports defined in said sleeve.

18. An improved cartridge valve, as defined in claim 16, wherein said fluid control circuitry includes elements selected from the group consisting of a pressure reducing valve, a check valve, a pressure balancing groove, a pressure compensated flow control valve, a shuttle valve, a pressure reducing valve, a reverse shuttle valve, and a filter.

19. An improved cartridge valve of the type having a generally round, hollow sleeve, said cartridge valve to be inserted in a manifold cavity, wherein said improvement comprises: providing fluid control circuitry including at least one valve in the wall of said sleeve.

* * * * *